UNITED STATES PATENT OFFICE.

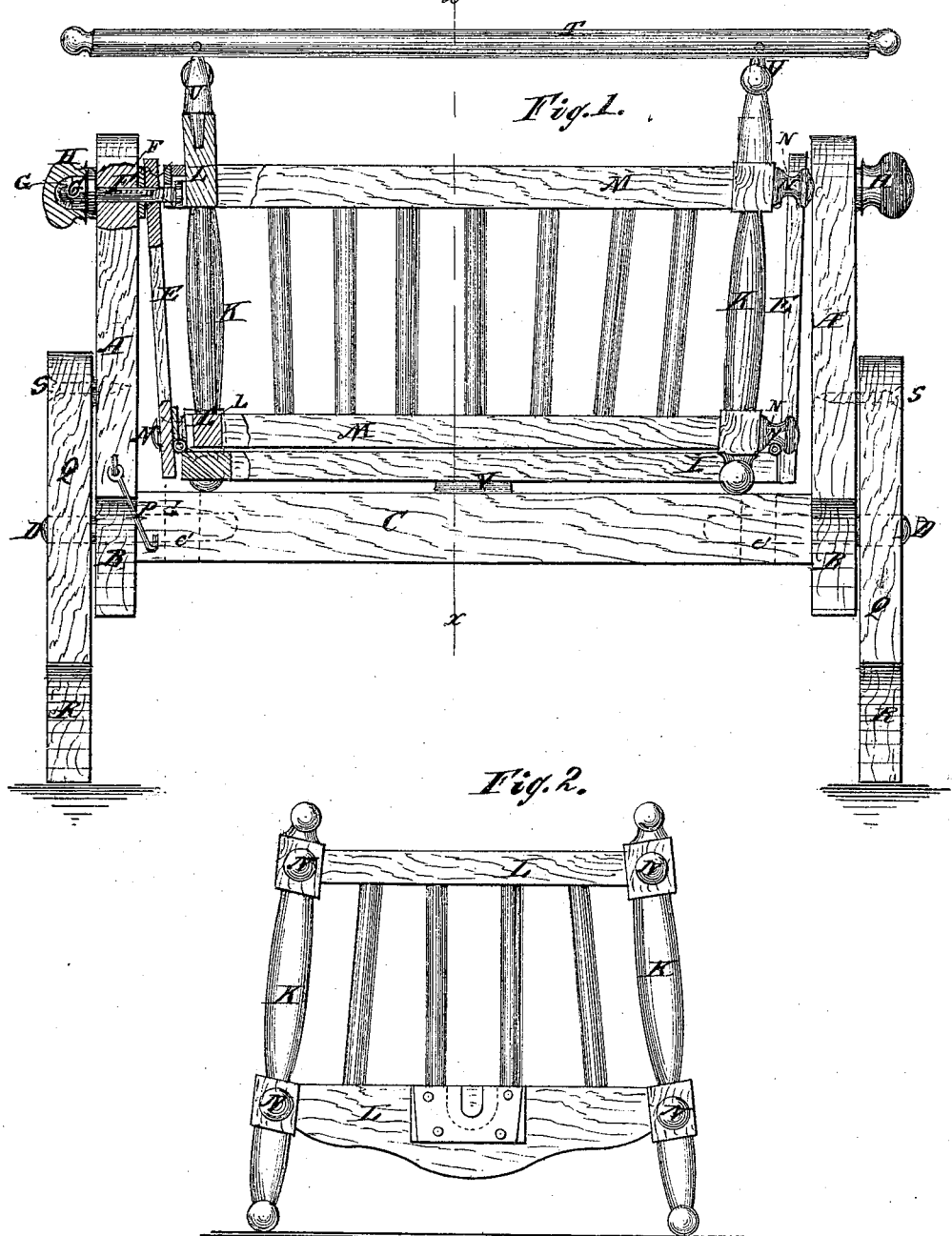

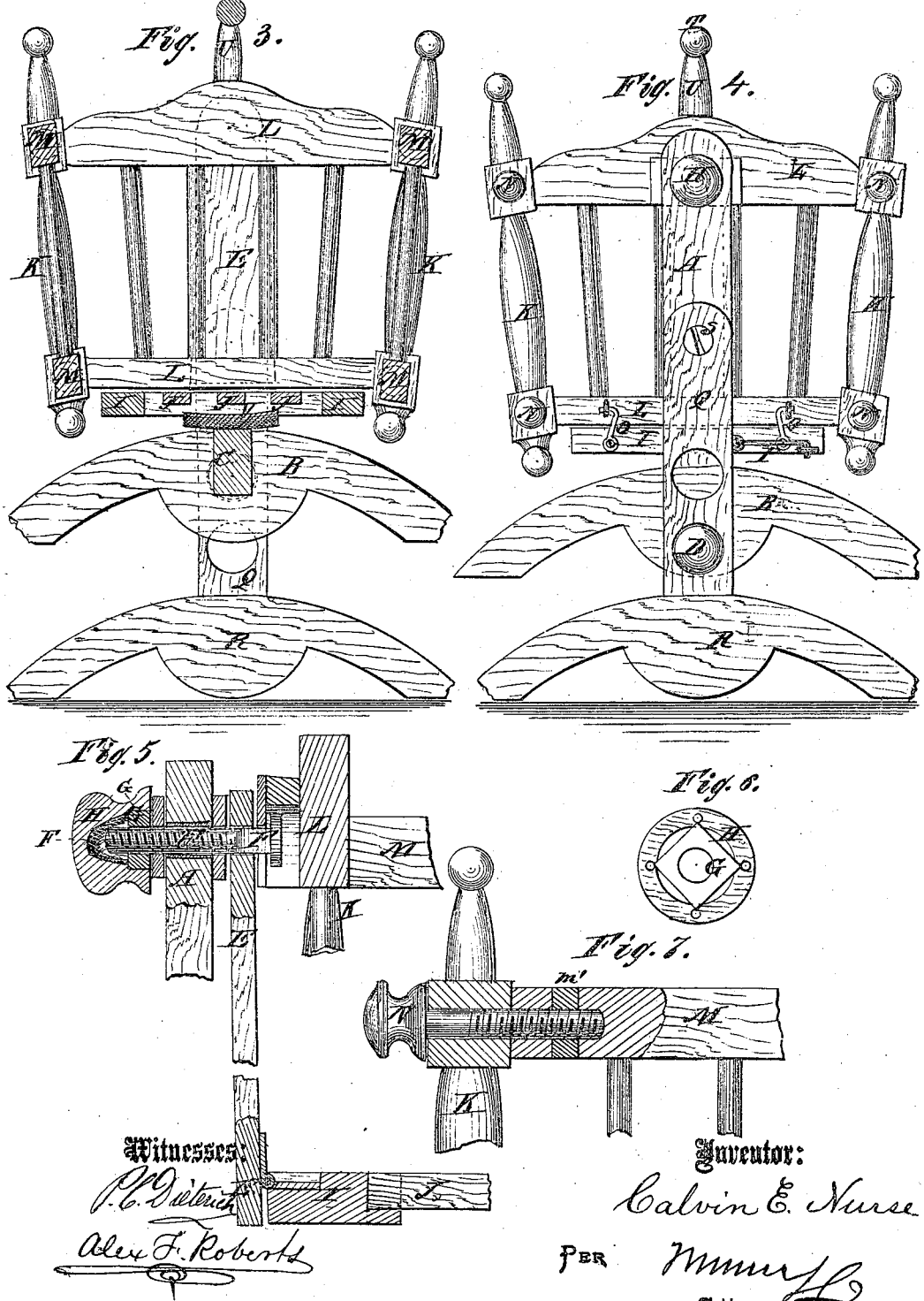

CALVIN E. NURSE, OF CHESTERFIELD FACTORY, NEW HAMPSHIRE, ASSIGNOR TO WILLIAM W. HOPKINS, OF SAME PLACE.

IMPROVEMENT IN CRADLES, CRIBS, AND STANDING-STOOLS COMBINED.

Specification forming part of Letters Patent No. 133,169, dated November 19, 1872; antedated November 16, 1872.

*To all whom it may concern:*

Be it known that I, CALVIN E. NURSE, of Chesterfield Factory, in the county of Cheshire and State of New Hampshire, have invented a new and useful Improvement in Combined Cradle, Crib, and Standing-Stool, of which the following is a specification:

Figure 1, Sheet I, is a side view of my improved device adjusted as a crib, parts being broken away to show the construction. Fig. 2, Sheet I, is an end view of the same adjusted as a standing-stool. Fig. 3, Sheet II, is a detail cross-section of the same adjusted as a crib, taken through the line $x\ x$, Fig. 1. Fig. 4, Sheet II, is an end view of the same adjusted as a crib. Fig. 5, Sheet II, is a detail sectional view, illustrating the manner in which the cradle is suspended from the stationary standards. Fig. 6, Sheet II, is a detail view of the knob-nut. Fig. 7, Sheet II, is a detail sectional view, illustrating the manner in which the parts are connected together.

Similar letters of reference indicate corresponding parts.

My invention has for its object to furnish an improved combined cradle, crib, and standing-stool, which shall be so constructed that it may be conveniently adjusted for use in either capacity, and which may be compactly folded for storage or transportation; and it consists in the construction and combination of the various parts, as hereinafter more fully described.

A are two standards, to the lower end of each of which is attached a cross-bar, B, the ends of which are curved downward to rest upon the floor, and which is made of such a length as to give a firm and stable base. The two standards A B are connected by a longitudinal bar, C, the ends of which are secured to said standards by knob-screws D, which pass through the said standards and screw into the ends of the said bar C, blocks of wood $c'$ being inserted transversely in said bar C, near its ends, for the said screws to pass through, so that the threads of the screws may have a firm hold. E are vertical bars, the upper ends of which are connected with the upper ends of the standards A B by bolts F, which pass through the said bars and standards, and are secured in place by nuts G, which are secured in the bases of knobs H, which thus hide the ends of the bolts F and the nuts G, and at the same time serve as handles for moving the cradle. The heads of the bolts F are made flat, and the body of the said bolts at the inner sides of the said heads are flattened to receive the catch-plates attached to the ends of the cradle-body, to suspend and pivot the said body. The hole through the upper ends of the uprights A, through which the bolts F pass, are lined with a metallic bushing to prevent wear. The lower ends of the swinging bars E are hinged to the ends of the frame I that receives the slots J, upon which the bedding of the cradle or crib is placed, the frame I and slots J thus forming the bottom of said cradle or crib. This construction enables the bars E, when detached from the standards A B, to be turned down upon the rack or bottom I J for convenience in storage or transportation. K are the corner-posts of the cradle or crib body, which are permanently attached to the ends of the end frames L. M are the side frames of the said body, which are attached to the posts K by knob-screws N, which pass through the said posts K and screw into the ends of the top and bottom rails of said side frames, blocks $m'$ of wood being inserted transversely in said top and bottom rails to receive the said screws, to furnish a firm support for the screw-threads. The upper and lower ends of the posts K terminate in knobs, the top knobs projecting sufficiently to adapt them to serve as feet to support the said body when detached, and inverted, as shown in Fig. 2, to serve as a standing-stool for a child. The body K L M is secured detachably to the bottom I J by hooks O attached to the ends of the frame I, and which hook into eyes or staples attached to the bottom rail of the end frames L of said body. The body and bottom are held stationary, when desired, by the hook or hooks P attached to the uprights A, and which hook into eyes or staples attached to the end of the frame I. Q R are standards exactly like the standards A B, and the uprights Q of which have holes formed through them to receive the knobs of the screws D and a hole in their upper ends to receive a screw, S, by which said upper ends are secured to the uprights of the standards A B. Several holes are formed in the uprights Q to receive the knobs of the screws D, as shown in Figs. 3 and 4. By this construction, by attaching the standards Q R to the standards A B, the crib may be adjusted to the height of the bed by the side of which it is to be placed. By this construction, by detaching the bolts and knob-nuts F G H and the knob-screws N and D, the whole device may be compactly folded for storage or transportation. T is a ridge-pole or top rail, to which, near its ends, are attached the upper ends of the studs U, the lower ends of which have tenons formed upon them to enter holes in the center of the top rails of the end frames L of the body K L M. The ridge-pole T U is designed to support a mosquito-net in such a position that the child in turning over cannot reach it with its hands and pull it over and around its face. When not required for use the ridge-pole or bar T U can be readily detached and laid aside. To the middle part of the longitudinal bar C is attached a rubber block, V, against which the side bars of the frame I strike, to prevent the cradle-body from swinging too far, and to give it an impulse for the return movement.

Having thus described my invention, I claim as new and desire to secure by Letters Patent—

1. The bottom I J and hinged bars E, in combination with the standards A B and connecting-bar C, to adapt them to receive and support the body of the cradle or crib, substantially as herein shown and described.

2. The body K L M, constructed substantially as herein shown and described, to adapt it to be used in connection with the bottom I J, hinged bars E, and standards A B, or alone as a standing-stool, substantially as herein shown and described.

3. The bolts F, nuts G, and knobs H, constructed and arranged in connection with the standards A B, swinging bars E, and body K L M, substantially as herein shown and described, and for the purpose set forth.

CALVIN E. NURSE.

Witnesses:
CHARLES B. LEWIS,
JAMES C. FARWELL.